INVENTOR.
ROBERT Z. SCHREFFLER
BY
ATTORNEYS

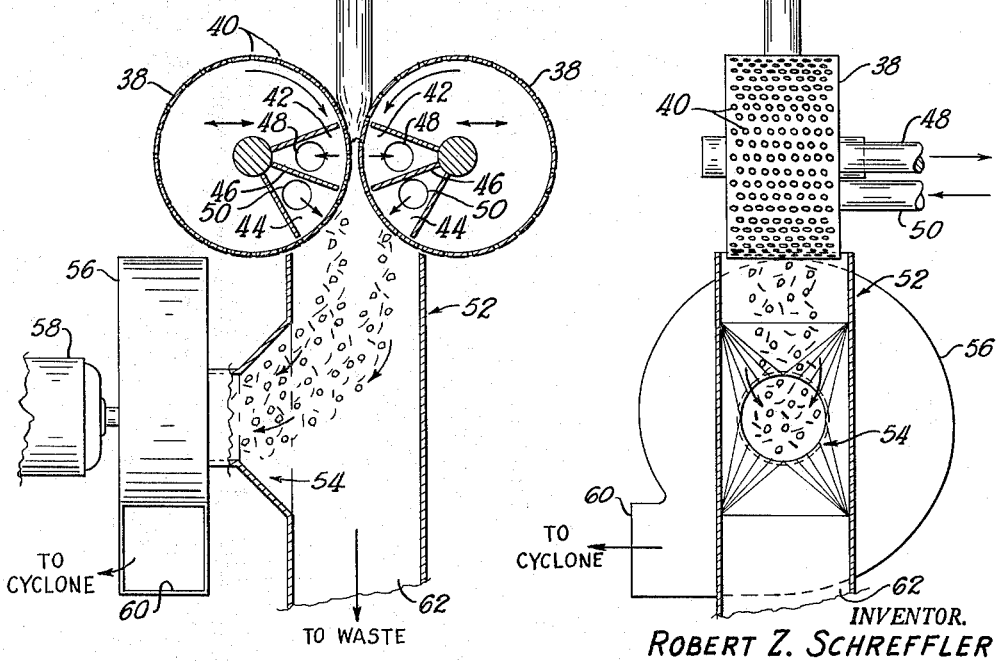

INVENTOR.
ROBERT Z. SCHREFFLER
ATTORNEYS

United States Patent Office 3,222,151
Patented Dec. 7, 1965

3,222,151
FLAKE GLASS BREAKOUT DETECTOR AND METHOD OF CONTROLLING GLASS BREAK-OUT
Robert Z. Schreffler, Brigham City, Utah, assignor to Owens-Corning Fiberglas Corporation, a corporation of Delaware
Filed Oct. 16, 1961, Ser. No. 145,378
6 Claims. (Cl. 65—29)

This invention relates to foliated glass in the form of flakes, and more particularly to a method and apparatus for producing flake glass without manual labor wherein interruptions in production are detected, substandard product caused thereby is isolated, and resumption of standard grade product formation are all effected continuously and automatically.

Foliated glass in the form of very small flakes on the order of a few microns in thickness is a relatively infant and novel product that is rapidly finding a broad range of new uses, including reinforcing agents for a vast number of materials such as synthetic resins, rubber, cement, mastic compositions, glass, paper and combinations of these materials. Also, this material may be combined with other reinforcing agents such as chopped fibrous glass strand for reinforcing resinous materials and the like. Still further, it can be admixed with other pulverulent materials to be used as fillers, extenders, modifiers or the like for a wide variety of substances.

Also, this unusual flake material can be coated with thin films of metal to enhance the light reflectivity of panels made of synthetic resins into which it is incorporated. Because it has unique light transmitting properties, it is finding substantial use in lighting fixtures. Thus it can be admixed with a liquid synthetic resin and molded into sheet form to provide highly effective light diffusers for electric fixtures of the elongated fluorescent type. Proper orientation of the flakes of glass in the resin provides a polarizing effect and this produces pleasant and softly diffused lighting.

Although this material is very useful and is finding rapidly expanding applications, it is neveretheless still quite expensive due to the method by which it is manufactured. Thus, it is presently made by forming an elongated and very delicate, thin walled tube of glass to produce an extremely thin film, which is broken into small flakes. Since the wall thickness of the filming tube is on the order of a few microns, it is substantially impossible to form film and flake continuously over extended periods of time without a break or rupture opening the tubing wall and thereby disrupting the process. When breaks occur, globs of glass are discharged from the feeding orifice of the glass melter to fall onto and contaminate the forming equipment and, unless the process is quickly stopped, flake product will also become contaminated with chunks of glass formed from the molten globs. Thus an operator is required to tend the process and machine to observe break-outs and be available and on the alert constantly to quickly shut down the machinery to prevent contamination of the machinery and of the product in case of a break.

In view of the fact that shut-down of the equipment must be immediate upon break-out, it will be understood that an operator is required to continuously tend each machine. Since the flakes are so thin and of low mass production, yields from a given machine are relatively low in pounds of product per hour. Thus it will be evident that the operator's time coupled with low yields, and the machine investment and operating expense substantially increase the cost of the product.

Accordingly, an advance in the art of producing foliated glass in the form of flakes would be provided if a continuous process and apparatus for its production could be developed wherein interruptions in production are detected; the machinery retracted and shut down before either it or the product could become contaminated; and production could be resumed in an automatic and continuous manner. Thus if this unique product of increasing utility could be manufactured on a more efficient basis and the price reduced, it would find even more broadened application. Thus, if the process and apparatus could be automated, one operator could look after a number of machines and this would substantially reduce the cost.

It is accordingly an important object of the present invention to provide a method and apparatus for producing foliated glass in a continuous and automated manner.

A further object is to provide a method and apparatus for producing foliated glass in flake form wherein interruptions in film formation are detected and the operation of the process and machinery are interrupted before the machine can become contaminated with molten glass and before non-flake materials are carried into the product collection chamber.

A further object is to provide a method for producing foliated glass in flake form wherein interruptions are detected and contaminating materials resulting therefrom are isolated from the product, and production is resumed all in an automatic manner without the aid of manual labor.

A still further object is to provide apparatus for producing foliated glass in flake form wherein a novel sensing device is provided to deactivate glass film-forming pull rolls and a pneumatic collector when a break-out occurs, and wherein an automatic reset mechanism is effective to start the pull rolls after a film has been re-established and then start the pneumatic collector after product is again being produced.

Other objects of this invention will appear in the following description and appended claims, reference being had to the accompanying drawings forming a part of this specification wherein like reference characters designate corresponding parts in the several views.

In the drawings:

FIGURE 1 is a front elevational view of apparatus used in producing foliated glass in the form of flake in accordance with the present invention;

FIGURE 2 is a side elevational view of the apparatus of FIGURE 1;

Figure 3:
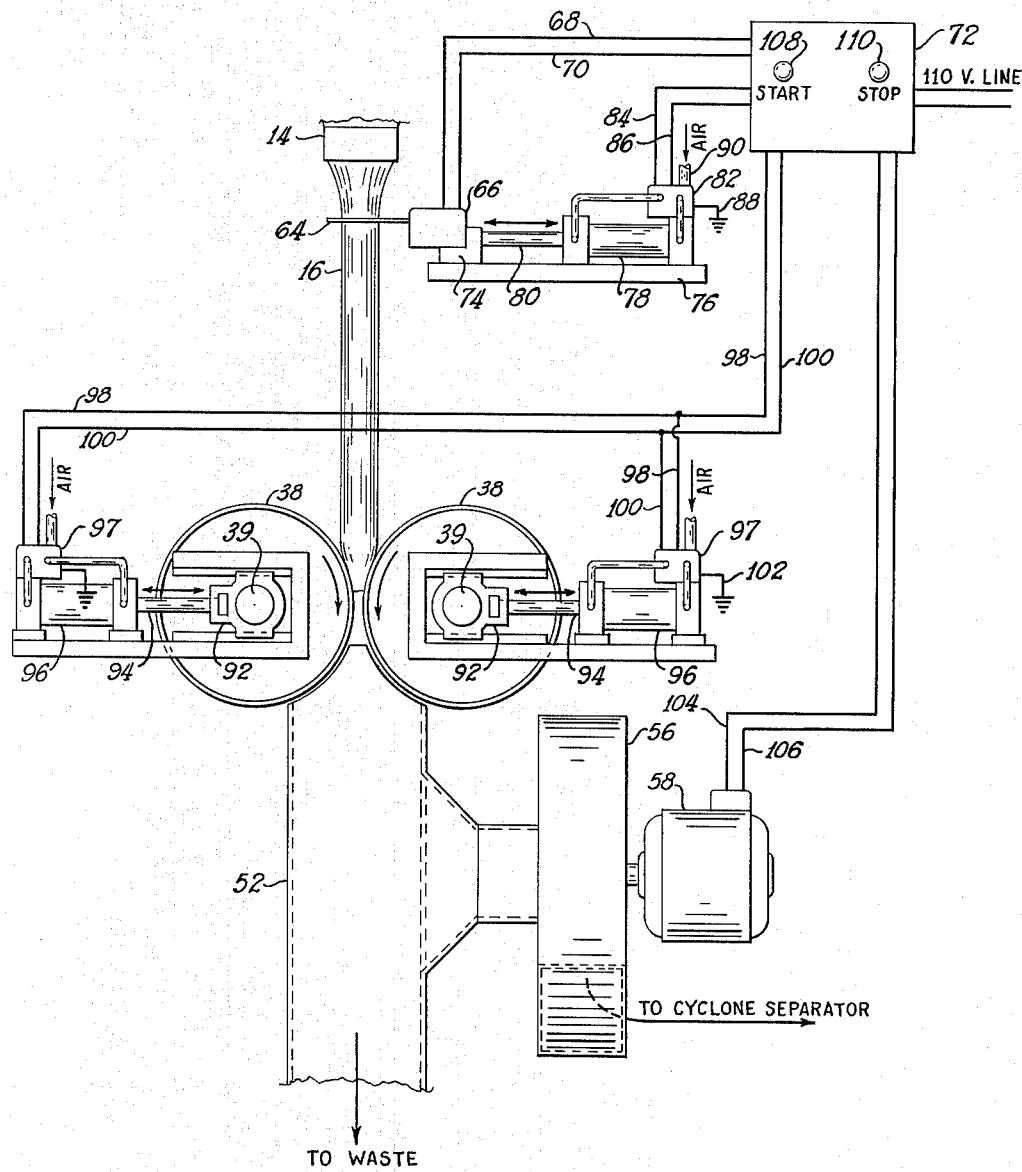
FIGURE 3 is a layout of the apparatus of the present invention illustrating the control mechanism for sequencing the process.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Brief perspective*

In accordance with the present invention, method and apparatus are provided for automatically producing foliated glass in flake form wherein a break in the formation of product is detected and the detection apparatus and the forming apparatus are both retracted to prevent contamination by contact with falling molten glass resulting from process interruption; and wherein the product collecting mechanism is stopped and the waste materials are diverted to a waste collector so that the product is not contaminated; and the process is reestablished through a series of sequencing steps whereby production of product is assured before collection is resumed.

More particularly, detectors or sensing feelers are positioned to be contacted by waste products generated after break-out. These feelers, when contacted, are adapted to actuate a retracting mechanism whereby they are withdrawn from contact with the waste, and simultaneously with their withdrawal the pull rolls used in producing the product are withdrawn to avoid contamination. Also, the collection fan is simultaneously shut off, permitting waste to go to the sewer. A time sequence mechanism is also simultaneously actuated, that provides a first time interval or pause whereby the glass filming tube is allowed to reestablish itself. Thereafter, the detectors move back into position and the pull rolls are returned to operating position to again draw the filming tube. A second pause then permits the new drawing operation to continue for a short time to allow the filming tube to develop uniform wall thickness and the flake product to thereby attain uniform standard grade. Thereafter the collection fan is restarted and the product is again collected.

If a second break should occur during start-up, the detectors, having been moved previously into position will automatically shut down that portion of the process and apparatus which have been restarted with the result that another restart is effected, thereby preventing contamination of the previously collected product.

*The environment*

As shown in FIGURES 1 and 2, foliated glass in flake form is produced in accordance with the present invention utilizing a glass melter-feeder or bushing 10 which is suitable for melting glass marbles or pellets. The melter-feeder 10 can be of any desired configuration and includes a melting chamber 12 with an annular orifice at the base thereof (not shown) through which molten glass flows to a cylindrical forming apron 14 to form a cylinder of glass 16. The feeder 10 is suitably formed of platinum or suitable alloy and is provided with electrical terminals 18, 20, 22, and 24 to which electric lines are connected for passing current through the melter to heat it by its own resistance and thereby melt glass materials fed thereto.

The melter 10 is also provided at the top with charging openings 26 through which materials are introduced for melting.

The melter-feeder 10 is charged with marbles 30 that are introduced into the charging openings 26 through marble chutes 32 which comprise a plurality of steel rods 34 held in a generally tube-like array by means of circular supports 36. The marbles are fed by gravity from a suitable storage hopper located above the bushing and are admitted into the feeder automatically as molten glass is removed. The steel rods 34 are spaced from each other as shown to permit fragments of marbles to drop out of the feeding chutes 32 and thus prevent jamming of marbles that would stop the flow.

A high-temperature resistant refractory (not shown) is placed around the bushing 10, except for exposed portions of the terminals 18, 20, 22 and 24 to retain heat in a known manner.

An air inlet 28 is provided centrally within the bushing 10 and extends to the bottom where it is connected to an annular outlet so that the cylinder of glass 16 can be provided interiorly with air or other suitable gas under very low pressure to keep the cylinder gently inflated to a desired size to provide a selected wall thickness and also prevent the walls from contacting each other and adhering together.

The cylinder of glass 16 moves downwardly between a pair of contra-rotating pull cylinders 38, 38 whose peripheries are slightly spaced apart so that the gas inflating the cylinder can be exhausted from the bottom end and so that the walls of the cylinder will not be forced together and adhere to each other while still in a nascent state. The cylinders 38, 38 are provided with uniformly spaced perforations 40 on their peripheral surfaces and are interiorly provided with suction boxes 42, 42 and pressure chambers 44, 44 which are positioned adjacent and below the suction boxes, being separated by common walls 46, 46.

The suction chambers 42, 42 are provided with conduits 48, leading to a suitable suction pump. The pressure chambers 44, 44 are also provided with gas inlet conduits 50. Thus as the cylinder of glass 16 moves downwardly between the slightly spaced pull cylinders 38, 38 the opposite sides of cylinder 16 are very gently compressed between the peripheries of the pull cylinders by atmospheric pressure cooperating with the reduced pressure within the opposing suction chambers. Thus as the cylinders 38, 38 rotate, a pulling force is imparted to draw the cylinder 16 downwardly and produce film. The cylinder 16 is split into two films as it passes the axis of cylinders 38, 38 with one film adhering to each of the pull cylinders. After the films pass the separating walls 46, they are exposed to pressurized gas from chambers 44 that is forced outwardly through the perforations 40 and breaks each film into small flakes. The flakes fall downwardly by gravity through a chute 52 that has a funnel shaped opening 54 in one side, leading to the inlet of a suction fan 56 The fan is provided with a rotor (not shown) and is powered by a motor 58. An exhaust outlet 60 in the housing of the fan 56 leads to a cyclone separator (not shown) where the flake glass product is recovered from the air stream.

The chute 52 also has a waste opening 62 so that when the fan is not running the product will automatically drop away to a waste receiver or sewer. However, when the fan is operating, flake glass produced by the pressure chambers 44, 44 of pull cylinders 38, 38 will be drawn into the fan and directed to a cyclone for recovery.

*The invention*

As shown in FIGURES 1, 2 and 3, a pair of feeler fingers 64 is provided in horizontal alignment on opposite sides of the cylinder of glass 16 and spaced a short distance below the bottom edge of the forming apron 14 where the cylinder is generated. It will be noted that during the drawing process, the cylinder of glass 16 necks down somewhat as it leaves the forming apron 14. Thus the feeler fingers 64 are spaced directly beneath the periphery of the forming apron 14. The feeler fingers 64 are attached to microswitches 66, 66 to shut down the mechanism in accordance with a very rapid sequence to be hereinafter described.

Figure 5:
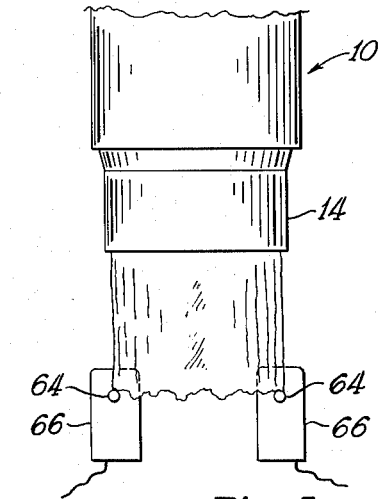
FIGURE 5 is an enlarged fragmentary view showing the sensing fingers at the moment of contact with a ruptured film-forming tube.

It will be noted in FIGURE 5 that when the cylinder of glass 16 is broken to disrupt the formation of product, the cylinder 16 no longer necks down; instead the glass beads down perpendicularly from the periphery of the forming apron 14. When this action takes place, the glass beading down will contact the feeler fingers 64 thereby actuating the microswitches 66 to substantially instantly stop the process and retract all equipment.

*The control structure*

By reference to FIGURE 3 of the drawings, it will be noted that the control structure includes the feeler fingers 64, connected to microswitches 66 that are in turn connected electrically by means of lines 68 and 70 to a control box 72. The microswitches 66 are mounted upon a yoke member 74 which is slidably carried upon a platform 76, to the back end of which an actuating air cylinder 78 is fixedly secured. The piston rod 80 of the air cylinder 78 is connected at its forward end to the yoke member 74 whereby upon actuation of the air cylinder 78, the yoke is moved either forwardly to a position where the feeler fingers 64 underlie the perimeter of the forming apron 14 or to a retracted position where they are free of contact with falling waste glass.

Mounted to the air cylinder 78 is a two way valve 82 which is provided with terminals to which control lines 84 and 86 are connected. A ground 88 is also provided. An air inlet conduit 90 is also connected to the two-way valve 82, with lines leading to each end of cylinder to drive the piston contained therein and attached piston rod 80 in a to and fro manner.

Operation of the detectors

Operation of this portion of the apparatus will now be described to facilitate an understanding of the associated apparatus to be later described.

When falling waste glass contains the feeler fingers 64, as illustrated in FIGURE 5, to ever so slightly move them, the microswitches 66 are accordingly actuated and a signal is carried by lines 68 and 70 into control box 72. Microswitches 66 have fixed contacts and a pivoted switch lever, from the end of which a feeler finger 64 is extended. The switch lever is very sensitive to movement and, thus, very slight movement of finger 64 causes the switch to close. This action throws a relay within box 72 to actuate a gang switch, having a control arm to close several circuits simultaneously, which sends current through line 86 to actuate the two-way valve 82 whereby air is introduced to the left end of cylinder 78 to drive the piston rod 80 to the right and retract the piston rod 80 and rapidly withdraw the feeler fingers 64 from beneath the forming apron 14 so that they are out of contact with falling waste. As will be subsequently described, a time delay mechanism contained in the control box 72, after a given interval, sends a signal through line 84 to valve 82 to admit air to the right hand end of air cylinder 78 and extend the piston rod 80 and thus move the feeler fingers 64 back into operative position.

The remaining controls

By reference to FIGURE 3, it will also be noted that the pull cylinders 38, 38 are adapted to be moved from an adjacent operative position to a separated inoperative position. For this purpose, the pull cylinders 38, 38 have the shafts 39, 39 thereof rotatably journaled in slide bearings 92, 92 which are connected to the front ends of the piston rods 94, 94 of air cylinders 96, 96. The cylinders 96, 96 also have two way valves 97, 97 associated therewith for reciprocating the piston rods 94, 94 in the same manner as described above for cylinder 78. To each of the two-way valves there are connected first control lines 98, 98 and second control line 100, 100 that lead to control box 72 to receive current from the switching mechanism contained therein. Ground lines 102, 102 are also provided. It will be noted that the lines 98, 98 carry a signal to the outer ends of the valves 97, 97 of air cylinders 96, 96 to move the solenoid valves in such a manner as to admit air into the inner ends of the cylinders and retract the piston rods 94, 94. This action is effective to separate the pull cylinders 38, 38. Current carried by the lines 100, 100 is effective to actuate the solenoid valves 97, 97 to introduce air into the rear ends of the cylinders 96, 96 and extend the piston rods 94, 94 to return the pull cylinders 38, 38 to an adjacent, but slightly spaced, operative position as shown in FIGURES 3 and 1.

Also as shown in FIGURE 3, the motor 58 of the fan 56 is connected with lines 104 and 106 leading to the control box 72. A switch located in the control box 72 controls the flow of current to the motor 58 and thus the operation of the fan 56.

The control box 72 is provided with override start and stop switches 108 and 110 to be used when initially starting up and for extended shut down as for repairs.

Operation

Figure 4:
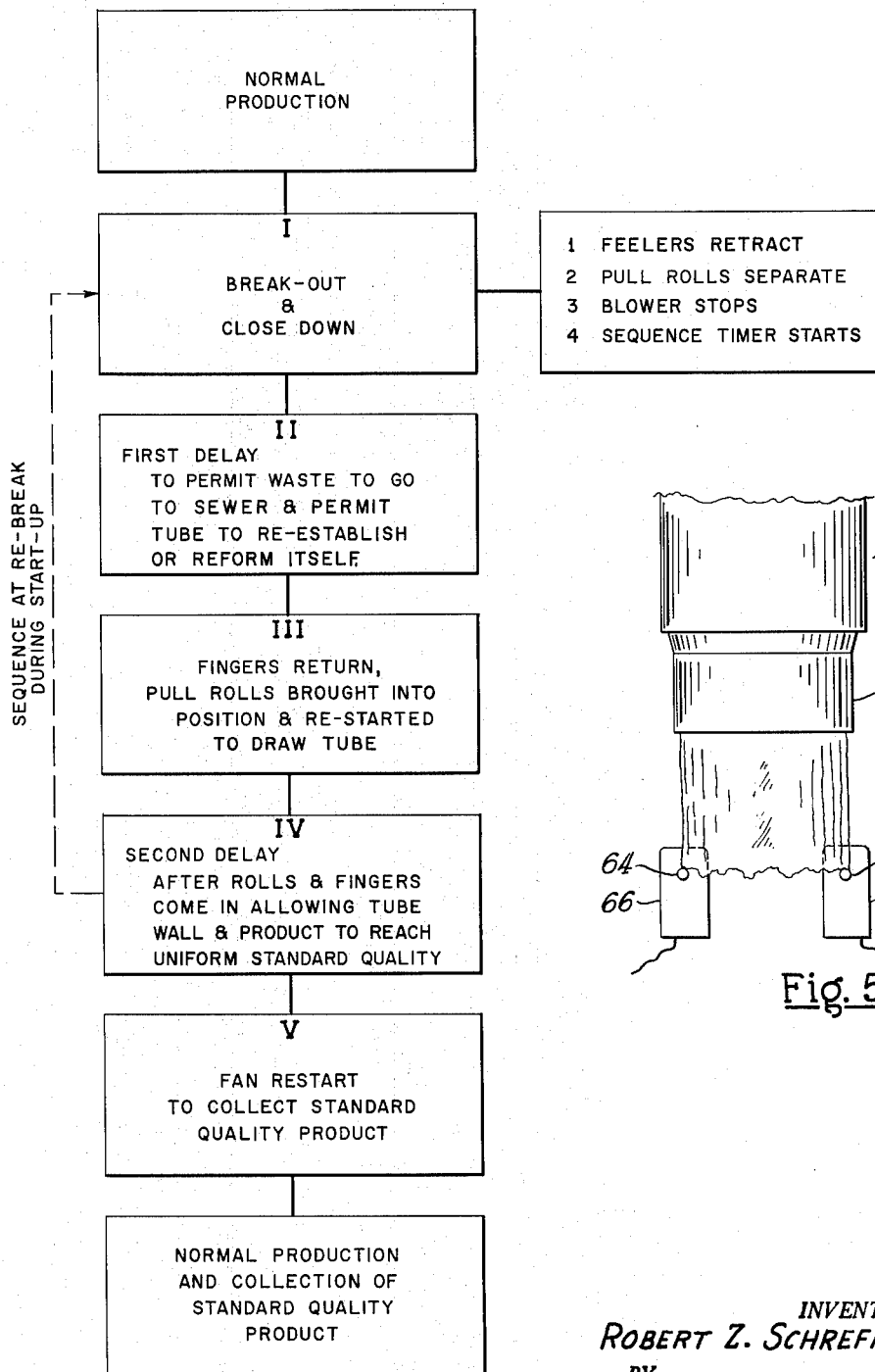
FIGURE 4 is a schematic illustration of the process of the invention, showing the steps involved in establishing product formation.

As shown in FIGURE 4, normal production of flake glass is represented by the top and bottom boxes. This means that glass forming materials are being fed to the melter 10 to form a body of molten glass which flows downwardly as a tube 16 from the forming apron 14. The tube necks in and down and is thus kept out of contact with the feeler fingers 64. The tube 16 is then pulled downwardly by the rotating pull cylinders 38, 38 utilizing the gripping action provided by the suction boxes 42. The film walls of cylinder 16 are then shattered into flakes by lightly compressed gas of about 0.5–1 p.s.i. from the pressure chambers 44 and the flakes fall by gravity downwardly past the funnel shaped opening 54 in the chute 52, to which the fan 56 is connected. Under normal operating conditions, the fan 56 is running and draws the product into its intake and directs the product in an airborne manner to a cyclone separator, where it is recovered from the air stream.

*Step I* is represented by the second box of FIGURE 4 and illustrates the control action imparted by the control box 72 of FIGURE 3 when a break-out occurs. Assuming that the wall of the glass film cylinder 16 ruptures, it will be obvious that the cylinder is no longer pulled downwardly by the pull cylinders 38, 38. When this happens, the glass will bead down from forming apron 14. That is to say, the glass collects at the bottom edge of the forming apron 14 as a heavy ring of viscous glass which will fall and contact the feeler fingers 64. When this happens, the feeler fingers actuate the micro switches 66, sending a signal by lines 68 and 70 to control box 72 to throw a relay that substantially instantaneously provides four simultaneous actions: (1) The air cylinder 78 is actuated to retract the feeler fingers 64; (2) the air cylinders 96, 96 are actuated to retract the pull cylinders 38, 38; (3) the relay trips a switch stopping the flow of current through lines 104 and 106 to the motor 58 to stop the fan 56; and (4) the relay thrown by the signal from the microswitches 66 starts a sequence timer contained within control box 72.

With the feeler fingers 64 retracted and with the pull cylinders 38, 38 retracted, it will be observed that the molten glass beading down does not contact these elements to contaminate them. Further, with the fan 56 shut off, none of the waste will be drawn into the fan to be collected, but instead will fall through the waste opening 62 to be carried away to suitable disposal.

*Step II* is initiated by the sequence timer, started during step I. The sequence timer first provides a delay to permit the ring of glass that collects at the bottom of the delivery apron 14 to fall to the waste opening 62 and carry a film of glass with it and thus re-establish the cylinder of glass 16. During all of this action, it will be remembered that air is being admitted to the interior of the cylinder through central conduit 28 to keep the walls of the cylinder 16 from adhering to each other.

*Step III* is then initiated by the sequence timer which throws two switches. The first switch sends current through line 84 to two-way solenoid valve 82 to admit air to the rear end of air cylinder 78 and thereby extend the piston rod 80 to move the feeler fingers 64 back into operative position. Also a switch is thrown to send current through lines 98, 98 to cylinders 96, 96 to extend the piston rods 94, 94 and move the pull cylinders 38, 38 back into adjacent operating relationship to contact the walls of the cylinders 16 and start the attenuating operation. Also the pressure chambers 44, 44 of the pull cylinders 38, 38 break the walls of the cylinders 16 into flakes which drop to the waste opening 62 until step V is initiated.

*Step IV.*—The timer of the control box 72 then provides a second delay after the rolls 38, 38 and feeler fingers 64 have been returned to operative positions to allow the attenuating operation to continue for a short period so that the walls of the cylinder become uniform and the flake product produced by the pressure chambers 44, 44 will be returned to standard grade.

*Step V* is then initiated by the sequence timer of control box 72 which throws a switch to restart the fan 56 and collect the standard quality product being produced by the pull cylinders 38, 38.

Thereafter, normal production and collection of standard quality product is provided.

Rebreak at start-up

As shown in FIGURE 4, provision is made for a subsequent break that may develop during the starting process. It has been found that re-establishment of the cylinder of glass 16 is a delicate operation and often requires repeating. This is one of the reasons why the fan 56 is not immediately started when the cylinder 16 is first established. Thus, a subsequent break is prevented from contaminating the product. Accordingly, the fan 56 is delayed to provide the cylinder 16 with an opportunity to stabilize itself and if during this delay, a subsequent break-out occurs, the feeler fingers 64 detect it and retract and also cause the pull rolls 38, 38 to retract. Inasmuch as the blower 56 has already stopped, the relay actuation of the blower switch to off position is of no effect. However, the sequence timer is reset to provide the delay of step II to permit the waste to go to sewer and the cylinder of glass 16 to re-establish itself. Thereafter, the pull rolls 38, 38 are again brought into position and the feeler fingers returned as in step III. Then after step IV, allowing the product to reach uniformity, the fan is restarted in step V. Thus, a safety feature is provided to prevent the product from being contaminated with large particles or non-flake fragments produced during bead down.

Extended scope of the invention

In describing the apparatus of the present invention, particularly the control mechanism shown in FIGURE 3, it has been indicated that air cylinders are used to position the feeler fingers 64 and the pull cylinders 38, 38. However, it is to be understood that the scope of the invention would include hydraulic cylinders as well as air cylinders for performing this function. Still further, it is to be included within the scope of the invention to use motorized rack and pinion devices for moving the feeler fingers 64 and pull cylinders 38, 38 into and out of position.

If desired, it is to be included within the scope of the invention to release live steam just beneath the perforated pull rolls 38, 38 to avoid static electricity and facilitate collection of the product.

Advantages of the present invention

From the foregoing, it will be observed that a process and apparatus are provided for completely mechanizing and automating the production of flake glass to a point where a single operator can tend a plurality of machines, as contrasted to the prior art, thereby substantially reducing the manual labor involved for each pound of product. Accordingly, the step forward provided by the present invention in reducing the cost of this highly versatile and useful material is a definite contribution to the art.

Utility of the improved product made in accordance with the present invention Foliated glass in the form of flakes, as made in accordance with the present invention to improved high standards of quality can be used for reinforcing asphalt emulsions to improve the weatherability thereof, particularly when the emulsions are stabilized on the acid side. Also, the combination of bentonite clay into such asphalt emulsions can also be effected. Inasmuch as the glass flakes are of very small size, asphalt emulsions reinforced therewith lend themselves admirably to application by spraying techniques, which is an important factor in the economic application of these materials.

Also, flake glass of highly improved uniformity, as produced in accordance with the present invention can be used to reinforce polyolefins, in turn used to produce blown containers. One of the problems heretofore encountered in the production of high density, linear, polyethylene containers, and for all other polyolefins for that matter, arises from permeability of these materials to air or oxygen. Odor and taste are imparted to foods contained in such containers because of this permeability factor. Flake glass is known to reduce permeability while at the same time it increases stiffness and reduces stress cracking of plastics to which it is added. Accordingly, improvement of blown plastic containers so that they can be used for packaging foods without imparting odor and taste, and yet be strong enough with sufficient stiffness to resist stress cracking provides a valuable step forward in the art.

Also, flake glass made in accordance with the present invention can be composited with mica flakes to provide ablation-resistant materials. In this respect, the flake glass can be leached to produce substantially pure silica flake and when combined with unleached regular flake glass, the latter acts as a cementing material. Also, flake glass made in accordance with the present invention can be combined with albumin flake or fiber or titania fibers as reinforcing materials.

Reinforced products made in this manner are characterized by high dielectric strength, low loss insulation values and utility over a very wide temperature range. While the physical and electrical properties would approach those of electrical porcelain, because glass flakemica admixtures can be formed by compression and transfer molding techniques similar to those used for plastics, the material offers the design benefits inherent in these processes. Materials of this type should find utility not only as electrical insulating materials, but also as excellent ablation-resistant materials for reentrant nose cones, etc.

I claim:

1. In apparatus for producing flake glass including a melter-feeder having a forming apron to produce a necked-down cylinder of glass film moving downwardly between a pair of spaced pull cylinders, and means to fracture the film into flakes as it moves through the pull cylinders, the improvement of a detector finger positioned vertically beneath the periphery of the forming apron to be contacted by molten glass beading down in non-necking relation from the forming apron, said detector finger supported from a microswitch, means mounting said detector finger and said microswitch, for movement between a detecting position and a retracted position, means mounting the pull cylinders for movement between an operating position and a non-operating, retracted position, product collection means positioned beneath said pull cylinders and including means to guide defective materials to waste, fan means having an inlet connected to said collection means to divert flake glass falling by gravity from said cylinders through said collection means, and actuator means connected to said microswitch, said pull cylinders and said fan, said actuator means being energized by non-necking glass contacting said finger to retract said finger and said pull cylinders and stop said fan to permit molten glass to fall to waste without contaminating said finger, said pull cylinders and said fan.

2. In a method of producing glass flakes from a body of molten glass by feeding the glass from the molten body through an annular orifice and drawing the molten glass directly into a thin-walled cylinder by pulling on the cylinder, the steps of moving the glass from the body as a molten annular mass through the annular feed orifice, pulling the glass directly from said molten annular mass to cause it to neck down into a thin-walled cylinder, by passing the cylinder between a pair of separable pull cylinders spaced from the annular orifice, exposing the thin-walled cylinder to the ambient atmosphere to cool and harden the thin-walled cylinder, fracturing the thin-walled cylinder into flakes during passage through the cylinders, collecting the flakes, positioning a movable sensing device alongside said thin-walled cylinder and in axial alignment with the periphery of the molten annular mass issuing from the annual feed orifice, to detect glass moving away from said annular orifice without necking down, detecting rupture of said thin-walled cylinder by physically sensing glass moving away from said molten annular mass without necking down, upon detecting a rupture of said cylinder, moving said pull cylinders apart and moving said sensing device to avoid contact with said non-necking glass, and diverting the non-necking glass away from contact with the collected flakes, whereby the recovered product is separated from the non-product glass issuing from said annulus.

3. The invention of claim 2 wherein the molten glass is fed vertically downwardly from the molten body and from said annular orifice, and rupture of said thin-walled cylinder is detected by sensing glass moving downwardly from said molten annular mass along a cylindrical path of a diameter equal to the diameter of the annular orifice.

4. In a method of producing flakes from a body of heat-softenable material by feeding the material in molten form through an annual orifice and drawing the material directly from the orifice into a thin-walled cylinder by pulling on the cylinder to reduce the diameter to less than that of the annular orifice, the steps of moving the material from the body of molten material as a molten annular mass, through the annular orifice, pulling directly on the material from the annular orifice to cause it to neck down directly into a thin-walled cylinder, of a diameter less than the diameter of the orifice by means spaced a substantial distance from the orifice, and said means being movable radially of the thin-walled cylinder, into and out of pulling, contacting relation with the cylinder, cooling to solidify the thin-walled cylinder in the space between the orifice and the pulling means, fracturing the thin-walled cylinder into flakes after it is pulled and cooled, diverting the flakes away from the path of travel of the thin-walled cylinder, to a receiving chamber, positioning a sensing element in operable alignment with said orifice to detect material moving away from said orifice without necking down, detecting rupture of the thin-walled cylinder by sensing material moving away from said orifice without necking down, upon sensing material moving away from said orifice in non-necking fashion, moving said pulling means out of cylinder pulling position to avoid said non-necking glass, and stopping flake collection, whereby the sensing device, the pulling means and the collected flake are not contaminated by the non-flake material.

5. In apparatus for producing flakes from a body of molten glass, a melter having a forming orifice to produce a cylinder of glass, a pair of opposed pull cylinders positioned in spaced relation to said forming orifice to engage the glass cylinder and pull it directly away from said orifice, thereby reducing the diameter and wall thickness and then fracture the thin-walled cylinder so produced into flakes, means mounting said cylinders for movement between an operating position and a retracted, non-operating position, collecting means to collect flakes from said cylinders, means for actuating and deactuating said collecting means between collecting and non-collecting conditions, a detector positioned between said forming orifice and said cylinders in operable alignment with the periphery of said orifice and thus normally out of detecting relation with the reduced diameter, thin-walled cylinder, means for moving said detector between detecting and non-detecting positions, and time sequence actuator means conected to said detector to receive a signal therefrom, to said detector moving means, to said pull cylinder moving means, and to said actuating means for said collecting means, whereby said detector will sense non-attenuated glass issuing from said orifice, indicating a rupture of said thin-walled cylinder, and in turn will signal said actuator which will in a time sequence retract said detector, retract said pull cylinders, deactuate said collecting means, or return the pull cylinders and detector and actuate the collecting means.

6. In apparatus for producing flakes from heat-softenable material, means for exuding a molten ring of the material into hollow cylinder form, means spaced from said exuding means for attenuating material from said ring directly into a thin-walled cylinder of a diameter less than the diameter of said molten ring, by pulling on the cylinder, means mounting said attenuating means for movement between an operaing position relative to said thin-walled cylinder, and a retracted non-operating position, means for fracturing said thin-walled cylinder into flakes, means mounting said fracturing means for movement between an operating position relative to said thin-walled cylinder, and a retracted, non-operating position, collecting means to collect flakes from said fracturing means, means for actuating and deactuating said collecting means between collecting and non-collecting conditions, a detector positioned between said exuding means and said attenuating means in a position to sense only material of the diameter of said exuding means, and time sequence actuator means connected to said detector to receive a signal therefrom, to said attenuator moving means, and to said actuator means for said collecting means, whereby said detector upon sensing material of the diameter of said molten ring, sends a signal to said time sequence actuator means, which in a time sequence moves said attenuating means and said fracturing means to retracted position, and deactuates said collecting means so that the attenuating means, the fracturing means and the collected flake are not contaminated by non-flake material.

References Cited by the Examiner

UNITED STATES PATENTS

| | | | |
|---|---|---|---|
| 2,251,726 | 8/1941 | Wellech et al. | 65—142 X |
| 2,339,590 | 1/1944 | Thomas et al. | 65—11 X |
| 2,780,889 | 2/1957 | Fulk | 65—181 X |
| 2,884,531 | 4/1959 | Bosch | 18—2 X |
| 2,972,210 | 2/1961 | Broman et al. | 65—160 X |
| 3,035,371 | 5/1962 | Mouly et al. | 65—161 |

DONALL H. SYLVESTER, *Primary Examiner.*